United States Patent
Dolan et al.

(10) Patent No.: US 6,293,998 B1
(45) Date of Patent: Sep. 25, 2001

(54) APPARATUS FOR USE IN PRESSURE AND TEMPERATURE SWING ADSORPTION PROCESSES

(75) Inventors: William B. Dolan, King of Prussia, PA (US); Mark M. Davis, Chicago, IL (US); Man-Wing Tang, Cerritos, CA (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 09/210,043

(22) Filed: Dec. 11, 1998

(51) Int. Cl.[7] ................................................ B01D 53/04
(52) U.S. Cl. ............................ 95/96; 95/99; 95/106; 95/115; 96/130; 96/143; 96/146; 96/154
(58) Field of Search ................... 95/96–106, 114, 95/115; 96/130–132, 143–146, 152–154

(56) References Cited

U.S. PATENT DOCUMENTS

| | | | |
|---|---|---|---|
| 3,176,444 | 4/1965 | Kiyonaga | 55/26 |
| 3,367,504 | 2/1968 | Westmoreland | 210/321 |
| 3,417,870 | 12/1968 | Bray | 210/321 |
| 3,430,418 | 3/1969 | Wagner | 55/25 |
| 3,703,068 | 11/1972 | Wagner | 55/21 |
| 3,986,849 | 10/1976 | Fuderer et al. | 55/25 |
| 4,033,878 | 7/1977 | Foreman et al. | 210/321 |
| 4,040,804 * | 8/1977 | Harrison | 96/144 X |
| 4,138,850 | 2/1979 | Tchernev | 60/641 |
| 4,234,326 * | 11/1980 | Bailey et al. | 96/154 |
| 4,402,717 | 9/1983 | Izumo et al. | 55/388 |
| 4,548,046 | 10/1985 | Brandon et al. | 62/79 |
| 4,637,218 | 1/1987 | Tchernev | 62/106 |
| 4,769,053 * | 9/1988 | Fischer, Jr. | 96/144 X |
| 4,814,079 | 3/1989 | Schneider | 210/321.83 |
| 5,120,331 * | 6/1992 | Landy | 96/153 X |
| 5,188,644 * | 2/1993 | Landy | 96/152 X |
| 5,338,450 | 8/1994 | Maurer | 210/286 |
| 5,477,705 | 12/1995 | Meunier | 62/480 |
| 5,487,869 * | 1/1996 | Retallick | 96/154 X |
| 5,512,083 * | 4/1996 | Dunne | 96/154 X |
| 5,518,977 | 5/1996 | Dunne et al. | 502/68 |
| 5,580,369 | 12/1996 | Belding et al. | 96/125 |
| 5,614,000 * | 3/1997 | Kalbassi et al. | 95/106 X |
| 5,846,295 * | 12/1998 | Kalbassi et al. | 95/106 X |

* cited by examiner

*Primary Examiner*—Robert H. Spitzer
(74) *Attorney, Agent, or Firm*—John G. Tolomei; Richard P. Silverman

(57) ABSTRACT

An apparatus for pressure and temperature swing adsorption processes is described. Such processes include pressure swing adsorption, temperature swing adsorption, and sorption cooling. The apparatus, a spirally wound module, provides high efficiency gas separations by reducing the differential pressure required between the adsorption pressure and the desorption pressure. The apparatus comprises an adsorption zone containing at least one adsorbent paper layer containing a selective adsorbent and an adsorbent spacer spirally wound about a hollow mandrel and in intimate thermal contact with a heat transfer zone. For pressure and temperature swing processes, the adsorption zone is disposed on the outside of the heat transfer zone, and for sorption cooling processes, the heat transfer zone is disposed on the outside of the adsorption zone and the adsorption zone is contained in an envelope-like leaf. The apparatus provides an opportunity to de-couple a purge step from the heating step in thermal swing adsorption with a resulting improvement in efficiency.

20 Claims, 3 Drawing Sheets

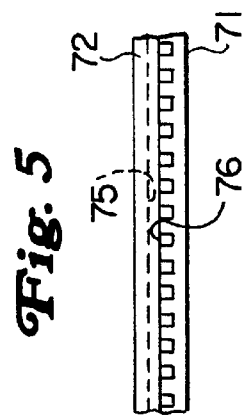
Fig. 5
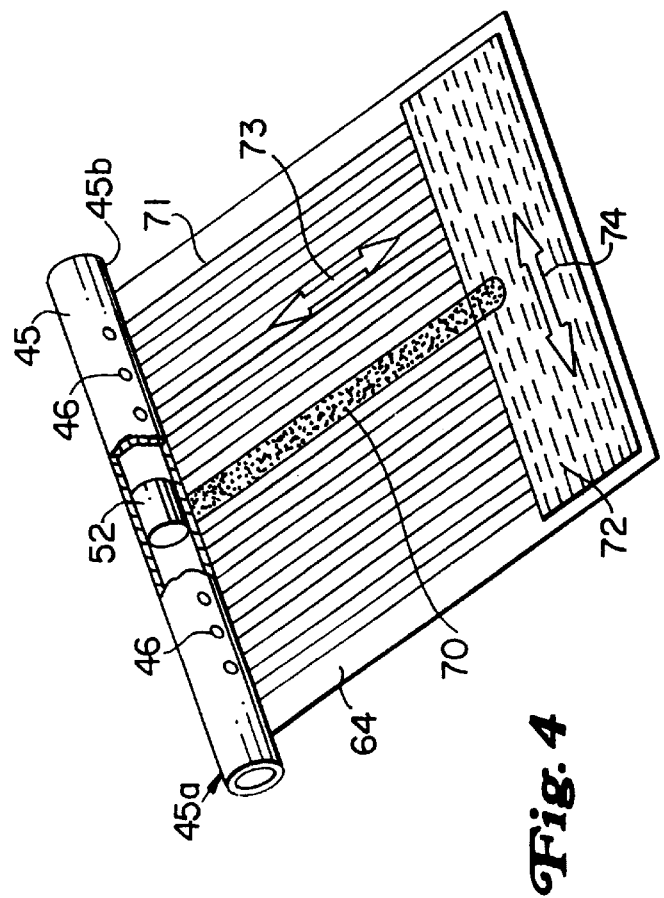
Fig. 4
Fig. 6
5-ZONE PITSA CYCLE
| ZONE | | | | | | | | | | |
|---|---|---|---|---|---|---|---|---|---|---|
| 1 | Ads | TP | Equal | PP | BD | Purge | PP | Equal | Rep | |
| 2 | Rep | Ads | | TP | Equal | PP | TP | BD | Purge | Equal |
| 3 | Purge | Rep | Equal | Ads | | TP | Ads | Equal | PP | BD |
| 4 | PP | Purge | BD | Rep | Equal | Ads | Rep | | TP | Equal |
| 5 | TPurge | PP | Equal | Purge | BD | Rep | Purge | PP | TP | Ads |

APPARATUS FOR USE IN PRESSURE AND TEMPERATURE SWING ADSORPTION PROCESSES

FIELD OF THE INVENTION

The present invention relates to an apparatus for use in adsorption processes. More particularly, the present invention relates to the use of a layer of adsorbent paper containing a solid adsorbent and disposed in a spirally wound configuration to perform adsorption and desorption based separation and sorption cooling processes.

BACKGROUND OF THE INVENTION

Pressure and temperature swing adsorption processes and sorption cooling processes typically employ some adsorbent disposed in a metal vessel and on a metal screen or surface which provides support for the adsorbent and permits the adsorbent to be placed in contact with the fluid stream containing the adsorbable component over the range of conditions necessary for the adsorption and desorption. The metal structures and physical arrangement of these devices has placed certain process limitations which restrict the amount of adsorbent which actually comes in contact with the fluid stream, or is accompanied by heat transfer inefficiencies inherent in the disposition of the adsorbent.

Pressure and Temperature Swing Adsorption

Processes based on the selective adsorption of a fluid or a component of a fluid stream generally involve contacting the fluid stream with the selective adsorbent in an adsorption zone and the process is carried out in a series of steps. The adsorption zone is maintained at adsorption conditions favorable to selectively adsorbing a portion of the fluid stream or an adsorbable component of the fluid stream and producing an adsorption effluent which has a reduced concentration of the adsorbed component relative to the fluid stream. The adsorbable component is then desorbed from the adsorption zone by either reducing the pressure of the adsorption zone to a desorption pressure, or by increasing the temperature of the desorption zone to a desorption temperature. At the desorption conditions, the adsorbable component is purged from the adsorption zone. Following the desorption step, the adsorption zone is purged to remove the adsorbed component. The adsorption zone is then returned to the adsorption conditions by either cooling the adsorption zone or by repressurizing the adsorption zone. In addition to the above discrete steps, additional integration which link a first adsorption zone with another adsorption zone which is out of phase with the first adsorption zone are provided to conserve energy such as pressure equalization steps to reduce overall efficiency in pressure swing adsorption processes.

In pressure swing adsorption (PSA), a multi-component gas is typically fed to at least one of a plurality of adsorption zones at an elevated pressure effective to adsorb at least one component, while at least one other component passes through. At a defined time, the feedstream to the adsorber is terminated and the adsorption zone is depressurized by one or more cocurrent depressurization steps wherein pressure is reduced to a defined level which permits the separated, less strongly adsorbed component or components remaining in the adsorption zone to be drawn off without significant concentration of the more strongly adsorbed components. Then, the adsorption zone is depressurized by a countercurrent depressurization step wherein the pressure on the adsorption zone is further reduced by withdrawing desorbed gas countercurrently to the direction of the feedstream. Finally, the adsorption zone is purged and repressurized. The final stage of repressurization is typically with product gas and is often referred to as product repressurization. In multi-zone systems there are typically additional steps, and those noted above may be done in stages. U.S. Pat. No. 3,176,444 issued to Kiyonaga, U.S. Pat. No. 3,986,849 issued to Fuderer et al., and U.S. Pat. No. 3,430,418 and U.S. Pat. No. 3,703,068 both issued to Wagner, among others, describe multi-zone, adiabatic pressure swing adsorption systems employing both cocurrent and countercurrent depressurization, and the disclosures of these patents are incorporated by reference in heir entireties. The above-mentioned patents to Fuderer et al., and Wagner are herein incorporated by reference.

Various classes of adsorbents are known to be suitable for use in PSA systems, the selection of which is dependent upon the feedstream components and other factors generally known to those skilled in the art. In general, suitable adsorbents include molecular sieves, silica gel, activated carbon, and activated alumina. For some separations, specialized adsorbents can be advantageous.

In thermal swing adsorption (TSA) wherein the adsorbent undergoes a regeneration with steam or with a stream of heated fluid such as a slip stream of treated adsorption effluent from another adsorber. The steam or heated fluid is introduced to the adsorption zone in a desorption mode to desorb the adsorbed impurities and purge them from the adsorption zone. The desorbed impurities may be recovered, for example, by condensation of the hot regenerant stream as in the example of using steam as a regenerant, or disposed of by incineration when a heated fuel gas is employed as the regenerant. In a typical TSA installation, two or more adsorption zones are operated in an alternating manner to provide continuous treating wherein at least one adsorption zone is operating in an adsorption mode while another is operating in a desorption mode.

Generally, PSA and TSA processes are carried out with the selective adsorbent disposed in fixed beds and the fluid streams are passed through the fixed bed adsorption zones at varying conditions depending upon the particular cycle taking place. Often PSA cycles are limited by the hydraulics of the fixed bed which relate to the actual height of the bed, the adsorbent particle size, and the density of the adsorbent particle. Some TSA processes are carried out by disposing the adsorbent on a paper in an adsorbent wheel as exemplified in U.S. Pat. No. 4,402,717 to Izumo et al. In Izumo et al., an apparatus for removing moisture and odors from a gas stream comprises a cylindrical honeycomb structure made from corrugated paper, uniformly coated with an adsorbent and formed in the shape of a disk or wheel. The multiplicity of adsorbent-coated parallel flow passages formed by the corrugations in the paper serve as gas passage ways which are separated as a zone for the removal of water and odor causing components in the gas, and as a zone for the regeneration of the adsorbent. The zones for removal and regeneration are continuously shifted as the wheel is rotated circumferentially about its central axis. For example, monolithic or honeycomb structures rotate around either a vertical or a horizontal axis. Solvent-laden air flows through the wheel parallel to the axis of rotation. All but a small portion of the adsorbent is always removing water and odor causing components. The other (small) portion of the wheel is undergoing thermal regeneration—usually in the opposite flow direction. The wheel continuously rotates to provide a continuous treated stream and a constant concentrated stream. The coated wheel units suffer many disadvantages. They require a large physical space to accommodate the enclosure for the wheel having the multiple removal and regeneration zones, and the associated gas transfer equipment (fans and blowers). The adsorbent-coated paper has limited range of humidity and temperature within which it can maintain its structural integrity. This failure also limits the regeneration medium to dry, moderate temperature gases and air. The contact between the adsorbent and the gas stream and hence the adsorbent capacity for volatile organic compounds is limited to the very thin layers of adsorbent on the surface of the paper. U.S. Pat. No. 5,580,369, which is hereby incorporated by reference, discloses an adsorbent wheel which is composed of an organic synthetic paper support and an adsorbent dispersed in the paper support comprised of a Y-type zeolite blended with either silica gel, alumina, or X-type zeolite. U.S. Pat. No. 5,338,450 attempts to overcome problems associated with "adsorbent wheel" systems by employing a spiral-wound adsorber module which comprises a spiral adsorbent bed supported within a cylinder by an inlet screen and an outlet screen on opposite sides of the adsorbent bed and requires the fluid to pass through the adsorbent bed which is thermally regenerated.

Thermal swing adsorption systems are attractive when applied to concentrating somewhat more dilute mixtures of organic compounds and often achieve greater than 99% removal efficiency. Generally, thermal swing adsorption systems employ strong adsorbents—adsorbents with a strong affinity for adsorbing the trace component—for separating trace components which are present in the fluid stream. Typically the trace components in the feed stream are present in amounts less than about 3 mole percent. Thermal swing adsorption processes are also limited because the amount of purge gas required to both heat and sweep the adsorbent can be a considerable fraction relative to the amount of feed.

Pressure swing adsorption generally employs weak adsorbents and is used for separations wherein the amount of the component to be separated can range from about 5 mole percent to about 95 mole percent. PSA systems are preferred when high concentrations of valuable feedstock, products, or reusable solvents are to be recovered. A PSA cycle is one in which the desorption takes place at a pressure much lower than adsorption. In some applications, the desorption takes place under vacuum conditions—vacuum swing adsorption (VSA). To overcome the inherent low operating loadings on the weak adsorbent, pressure swing cycles generally have cycle times that are short—on the order of seconds to minutes—to maintain reasonably sized adsorbent beds.

Sorption Cooling

In the operation of sorption cooling systems, generally there are two or more solid beds containing a solid adsorbent. The solid adsorbent beds desorb refrigerant when heated and adsorb refrigerant vapor when cooled. In this manner the beds can be used to drive the refrigerant around a heat pump system to heat or cool another fluid such as a process stream or to provide space heating or cooling. In the heat pump system, commonly referred to as the heat pump loop, or a sorption refrigeration circuit, the refrigerant is desorbed from a first bed as it is heated to drive the refrigerant out of the first bed and the refrigerant vapor is conveyed to a condenser. In the condenser, the refrigerant vapor is cooled and condensed. The refrigerant condensate is then expanded to a lower pressure through an expansion valve and the low pressure condensate passes to an evaporator where the low pressure condensate is heat exchanged with the process stream or space to be conditioned to revaporize the condensate. When further heating no longer produces desorbed refrigerant from the first bed, the first bed is isolated and allowed to return to the adsorption conditions. When the adsorption conditions are established in the first bed, the refrigerant vapor from the evaporator is reintroduced to the first bed to complete the cycle. Generally two or more solid adsorbent beds are employed in a typical cycle wherein one bed is heated during the desorption stroke and the other bed is cooled during the adsorption stroke. The time for the completion of a full cycle of adsorption and desorption is known as the "cycle time." The heating and cooling steps are reversed when the beds reach the desired upper desorption temperature and lower adsorption temperature limits of the adsorption cycle. The upper and lower temperatures will vary depending upon the selection of the refrigerant fluid and the adsorbent. Some thermodynamic processes for cooling and heating by adsorption of a refrigerating fluid on a solid adsorbent use zeolite and other sorption materials such as activated carbon and silica gel. In these processes, the thermal energy from adsorbing zeolite in one place is used to heat desorbing zeolite located in another place. U.S. Pat. No. 4,138,850 relates to a system for solar heat utilization employing a solid zeolite adsorbent mixed with a binder, pressed, and sintered into divider panels and hermetically sealed in containers. The U.S. Pat. No. 4,637,218 to Tchernev relates to a heat pump system using zeolites as the solid adsorbent and water as the refrigerant wherein the zeolite is sliced into bricks or pressed into a desired configuration to establish an hermetically sealed space and thereby set up the propagation of a temperature front, or thermal wave through the adsorbent bed. The bricks used in U.S. Pat. No. 4,637,218 are preferably not more than 10 mm in thickness. U.S. Pat. No. 5,477,705 discloses an apparatus for refrigeration employing a compartmentalized reactor and alternate circulation of hot and cold fluids to create a thermal wave which passes through the compartments containing a solid adsorbent to desorb and adsorb a refrigerant. U.S. Pat. No. 4,548,046 relates to an apparatus for cooling or heating by adsorption of a refrigerating fluid on a solid adsorbent. The operations employ a plurality of tubes provided with parallel radial fins, the spaces between which are filled or covered with solid adsorbent such as Zeolite 13X located on the outside of the tubes. U.S. Pat. No. 5,518,977 to Dunne et. al., which is hereby incorporated by reference, relates to sorption cooling devices which employ adsorbent coated surfaces to obtain a high cooling coefficient of performance.

It is an objective of the present invention to provide a pressure swing adsorption system which is able to achieve fluid separations at lower differential pressures than conventional fixed bed PSA systems.

It is an objective of the present invention to provide a combined pressure and temperature swing adsorption system which is not limited by fixed bed hydraulics.

An adsorber module is sought which does not have the size limitations of the adsorbent wheel and has an increased adsorbent capacity for the removal of impurities from gas streams.

It is a still further object of this invention to provide an adsorbent module which is mechanically simpler to operate and is less costly to construct than fixed bed adsorbers and rotating desiccant wheels.

It is the object of the instant invention to provide an improved sorption cooling system for use in waste heat recovery, space heating, and air conditioning systems which is not limited by the regeneration efficiency of the adsorbent.

SUMMARY OF THE INVENTION

The present invention frees processes for the separation of components in a fluid stream by temperature swing adsorption and pressure swing adsorption from the requirement of a vessel for containing an adsorbent bed, and further provides for the separation of the purge step from the heating step in thermal swing adsorption. The apparatus can be employed in a process which integrates pressure and temperature swing adsorption and which can be applied over a wide range of separations. The combined process of pressure and temperature swing adsorption (PITSA) now has the additional step of a thermal purge which can be carried out in a cocurrent or a counter current direction relative to the direction of the feed flow to the apparatus. Surprisingly, the PITSA process reduces the pressure ratio between the adsorption pressure and the desorption pressure while achieving the same degree of separation as a corresponding pressure swing adsorption process with a lower purge gas requirement than a thermal swing adsorption process. Adsorbents formerly considered too strong for applications of pressure swing adsorption now can be employed in the current invention, which can result in a more efficient use of the adsorbent and correspondingly reduce capital cost.

The present invention is directed to a spiral-wound adsorber apparatus. The spiral-wound adsorber apparatus comprises a spirally wound module for use in pressure and temperatures swing adsorption processes. In one embodiment, the apparatus comprises a hollow mandrel provided with a plurality of longitudinally spaced apart holes. The mandrel has a mandrel interior and an outer mandrel surface. At least one envelope-like leaf is fixed to the outer mandrel surface. The envelope-like leaf has an open end at the outer mandrel surface and a closed end opposite and thus forms an envelope interior and an outer envelope surface. The envelope-like leaf encloses at least a portion of the longitudinally spaced apart holes to provide communication between the mandrel interior and the envelope interior through the spaced apart holes. The envelope-like leaf is spirally wrapped around the mandrel, and an adsorbent layer comprising at least one adsorbent paper layer and at least one feed spacer is spirally wrapped around the mandrel so that the adsorbent paper layer is disposed on a side of the outer envelope surface. A flow blocking device substantially blocking the flow of a heat exchange fluid flowing through the mandrel is provided to establish a heat transfer inlet zone at a proximal end and a heat transfer outlet zone at a distal end of the mandrel. At least one heat transfer spacer is provided in the envelope interior extending from the open end of the envelope-like leaf towards the closed end. The heat transfer spacer is a combination of a first tricot layer having grooves extending in one direction and a second tricot layer having grooves extending in the opposite direction. The grooves in the first layer are in fluid communication with the grooves in the second tricot layer.

In an alternate embodiment of the spirally wound module for use in pressure and temperatures swing adsorption processes, a flow distributor is provided in the envelope interior for directing the flow of the heat transfer fluid into the envelope-like leaf through the holes aligned on one side of the mandrel so that the heat transfer fluid travels in the envelope-like leaf in a spirally outer direction and then returns in a spirally inner direction where the fluid flows back into the heat transfer conduit to the heat transfer outlet zone through the holes aligned on an other side of the flow blocking device.

In a further embodiment of the present invention there is provided a spirally wound adsorbent module for use in sorption cooling applications comprising a hollow mandrel provided with a plurality of longitudinally spaced apart holes. The hollow mandrel has a mandrel interior and an outer mandrel surface. At least one envelope-like leaf is connected to the outer mandrel surface. The envelope-like leaf has an open end at the outer mandrel surface and a closed end opposite and forms an envelope interior, an interior envelope surface, and an outer envelope surface. The envelope-like leaf encloses at least a portion of the longitudinally spaced apart holes to provide communication between the mandrel interior and the envelope interior through the spaced apart holes. The envelope-like leaf is spirally wrapped around the mandrel. An adsorbent layer is provided in the envelope interior extending from the open end towards the closed end. The adsorbent layer comprises at least one adsorbent paper layer disposed on the interior envelope surface and at least one adsorbent spacer. The adsorbent spacer is a first tricot layer having grooves extending in one direction. At least one feed spacer is spirally wrapped around the mandrel and disposed on a side of the outer envelope surface forming a heat transfer zone in the spirally wound adsorbent module.

In a still further embodiment, the invention is a pressure and temperature swing adsorption process using a spirally wound module. The spirally wound module comprises a hollow mandrel provided with a plurality of longitudinally aligned holes. The mandrel has a mandrel interior and an outer mandrel surface. There is at least one envelope-like leaf fixed to the outer mandrel surface. The envelope-like leaf has an open end at the outer mandrel surface and a closed end opposite and forms an envelope interior and an outer envelope surface enclosing at least a portion of the longitudinally aligned holes. Communication is provided between the mandrel interior and the envelope interior through the longitudinally spaced apart holes. The envelope-like leaf is spirally wrapped around the mandrel. An adsorbent layer comprising at least one adsorbent paper layer and at least one feed spacer is spirally wrapped around the mandrel so that the adsorbent paper layer is disposed on a side of the outer envelope surface to form the adsorption zone. A flow blocking device substantially blocking the flow of a heat transfer fluid through the mandrel is provided to establish a heat transfer inlet zone at a proximal end and a heat transfer outlet zone at a distal end of the mandrel. At least one spacer is provided in the envelope interior extending from the open end towards the closed end. The heat transfer spacer is a combination of a first tricot layer having grooves extending in one direction and a second tricot layer having grooves extending in the opposite direction. The grooves in the first layer are in fluid communication with the grooves in the second tricot layer. The process comprising a series of steps. A feed gas stream is passed to an adsorption zone at a feed end of a spirally wound module and an adsorption effluent is withdrawn from a product end opposite. The process further comprises thermally purging the adsorption zone by passing a hot heat transfer stream to the hollow mandrel to establish a thermal wave in the adsorption zone at a point between the feed end and the product end of the adsorption zone. Simultaneously or subsequently the adsorption zone is purged with a purge stream and a second adsorption effluent is recovered. The adsorption zone is thermally purged by passing the hot heat transfer stream to the inlet end or the outlet end of the hollow mandrel and the adsorption zone is simultaneously or subsequently purged with a second purge stream at a desorption temperature to produce a desorption effluent. A cold heat transfer stream and a portion of the warm heat transfer stream are passed to the inlet end or the outlet end of the mandrel to return the adsorption zone to the adsorption temperature. The above steps are repeated to provide a continuous process.

In a yet further embodiment, the invention is a process for continuous sorption cooling using spirally wound module. The spirally wound adsorbent module comprises a hollow mandrel provided with a plurality of longitudinally spaced apart holes. The hollow mandrel has a mandrel interior and an outer mandrel surface. At least one envelope-like leaf is connected to the outer mandrel surface. The envelope-like leaf has an open end at the outer mandrel surface and a closed end opposite, thus forming an envelope interior, an interior envelope surface, and an outer envelope surface. The envelope-like leaf encloses at least a portion of the longitudinally spaced apart holes to provide communication between the mandrel interior and the envelope interior through the holes. The envelope-like leaf is spirally wrapped around the mandrel. An adsorbent layer is provided in the envelope interior and extends from the open end towards the closed end. The adsorbent layer comprises at least one adsorbent paper layer which is disposed on the interior envelope surface and at least one adsorbent spacer. The adsorbent spacer is a first tricot layer having grooves extending in one direction. At least one adsorbent spacer is spirally wrapped around the mandrel and is disposed on a side of the outer envelope surface, thus forming a heat transfer zone in the spirally wound adsorbent module. The process comprising the following steps. A hot heat transfer stream is passed to a first spirally wound module to desorb a refrigerant from an adsorbent layer. The adsorbent layer contains an adsorbent selective for the adsorption of the refrigerant to provide a refrigerant vapor stream. The refrigerant vapor stream at a desorption pressure is withdrawn from the hollow mandrel of the first spirally wound module and passed to a condenser wherein the refrigerant vapor stream is cooled and at least partially condensed to provide a condensed refrigerant stream. The condensed refrigerant stream is passed to an isolation valve to reduce the pressure of the condensed refrigerant stream to an evaporator pressure and provide a cooled condensed refrigerant stream. The cooled condensed refrigerant stream is passed to an evaporator wherein the cooled condensed refrigerant stream is heat exchanged with an external stream to cool the external stream to provide a vaporized refrigerant stream. A cold heat transfer stream is passed to the heat transfer zone of another spirally wound module to cool the adsorbent layer. The vaporized refrigerant stream is passed to the other spirally wound module to adsorb the vaporized refrigerant stream. The above steps are repeated to provide a continuous sorption cooling process.

BRIEF DESCRIPTION OF THE DRAWINGS

FIG. 4 is a perspective view of the mandrel and envelope-like leaf of FIG. 3.

FIG. 5 is an exploded view of the tricot heat transfer spacers of FIG. 4.

FIG. 6 is a cycle chart for a 5-zone pressure integrated temperature swing adsorption process of the present invention.

DETAILED DESCRIPTION OF THE INVENTION

Figure 1:
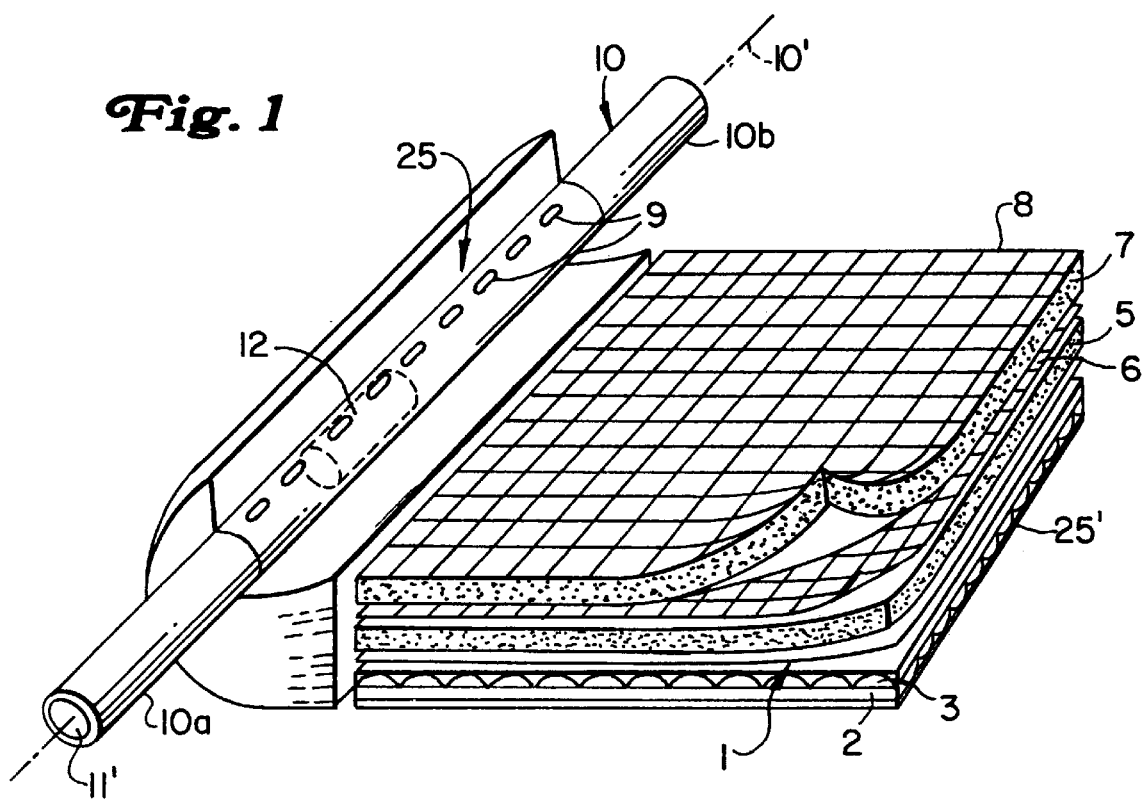
FIG. 1 is a perspective view of a spiral wound module of the present invention as seen during fabrication of a module for use in a pressure and temperature swing adsorption process.

A key advantage of the present invention is that the heating step in a thermal swing adsorption process is uncoupled from the purge step. Thus, in the present invention, one may conduct a thermal purge step to desorb the adsorbed species by introducing a hot heat transfer stream to the heat transfer zone in a cocurrent direction (in the same direction as the feed) or in a countercurrent direction (opposite to the direction of the feed flow). In this manner, the adsorption zone can be desorbed by raising the temperature of the adsorption zone to a desorption temperature without the requirement for introducing a purge gas to heat the adsorption zone. The thermal purge step also can be employed with an adsorbent purge step by introducing a purge stream to the adsorption zone in either a cocurrent or a countercurrent direction to sweep the desorbed species from the adsorption zone. The adsorbent purge step may be performed prior to, simultaneously with, or subsequently to the thermal purge step. In conventional thermal swing adsorption processes, following the completion of the adsorption step, the adsorption zone is heated to desorption conditions by passing a heated purge gas through the adsorption zone. This action establishes a thermal wave which moves through the adsorption zone in the direction of the passing of the purge gas. Generally, the purge gas is passed counter currently to strip the effluent end of the adsorption zone of adsorbed species and thus avoid contaminating the adsorption product when the feed is reintroduced. As the thermal wave approaches the effluent end of the adsorption zone, it pushes a portion of the purge gas at a temperature between the desorption temperature and the adsorption temperature out of the adsorption zone. Typically the thermal energy of this portion of the purge gas is lost to the adsorption process, because the spent purge gas is cooled outside the adsorption zone. Thus, the thermal wave is allowed to pass out of the adsorption zone. In the present invention, it is possible to use the spent heat transfer fluid at an intermediate temperature to pre-cool another adsorption zone which has recently completed a desorption step, thereby retaining thermal energy and further reducing the purge gas requirement. The heat transfer fluid which flows through the adsorption zone can establish a thermal wave in the adsorption zone and the heat transfer fluid leaving a first heat transfer zone at an intermediate temperature between the adsorption temperature and the desorption temperature may be employed to preheat or pre-cool another heat transfer zone of another adsorption zone at another point in the cycle.

In the present invention the adsorption zone is comprised of thin sheets of adsorbent paper layers separated by feed spacers and spirally wound about a mandrel. The adsorbent paper layers are in intimate contact with a heat transfer zone. For pressure and temperature swing processes, the adsorption zone comprises an envelope-like leaf which contains an adsorbent layer. The apparatus may be assembled in a conventional manner as illustrated in U.S. Pat. No. 5,154,832 to Yamamura et al. for the formation of the envelope-like leaves and their connection to the hollow mandrel. However, rather than the use of a gas permeable membrane, the present invention incorporates an adsorbent layer. The adsorbent layer comprises an adsorbent paper layer and a feed spacer. An example of the type of adsorbent paper layer for use in the present invention is disclosed in U.S. Pat. No. 5,650,221 to Belding et al which is hereby incorporated by reference. The adsorbent paper layer of U.S. Pat. No. 5,650,211 is comprised of an improved support material, fibrous material, binders, and high levels of desiccant or adsorbent material. The fibrous material includes cellulosic fibers, synthetic fibers and mixtures thereof. Fibrillated fibers, that is, fiber shafts which are split at their ends to form fibrils, i.e., fine fibers or filaments much finer than the fiber shafts are preferred. Examples of fibrillated, synthetic organic fibers useful in the adsorbent paper of the present invention are fibrillated aramid and acrylic fibers. A particularly preferred example of such a fiber is available from E.I. du Pont de Nemours & Company under the designation KEVLAR®. The desiccant or adsorbent may be incorporated therein during fabrication of the paper, or the paper may be formed and the desiccant or adsorbent coated thereon, or a combination of adsorbent incorporation during paper making and coating with adsorbent thereafter may be used. The adsorbent can be any material capable of adsorbing an adsorbable component from a mixture of the adsorbable component and a non-adsorbable component. The adsorbent may comprise powdered solid, crystalline compounds capable of adsorbing and desorbing the adsorbable compound. Examples of such adsorbents include silica gels, activated aluminas, activated carbon, molecular sieves and mixtures thereof. Molecular sieves include zeolite molecular sieves. Other materials which can be used as adsorbents include halogenated compounds such as halogen salts including chloride, bromide, and fluoride salts as examples. The preferred adsorbents are zeolites. The pore size of the zeolitic molecular sieves may be varied by employing different metal cations. For example, sodium zeolite A has an apparent pore size of about 4 Å units, whereas calcium zeolite A has an apparent pore size of about 5 Å units. The term "apparent pore size" as used herein may be defined as the maximum critical dimension of the molecular sieve in question under normal conditions. The apparent pore size will always be larger than the effective pore diameter, which may be defined as the free diameter of the appropriate silicate ring in the zeolite structure. Zeolitic molecular sieves in the calcined form may be represented by the general formula:

$$Me_{2/n}O:Al_2O_3:xSiO_2:yH_2O$$

where Me is a cation, x has a value from about 2 to infinity, n is the cation valence and y has a value of from about 2 to 10. The general formula for a molecular sieve composition known commercially as type 13X is:

$$1.0\pm0.2Na_2O:1.00Al_2O_3:2.5\pm0.5SiO_2$$

plus water of hydration. Type 13X has a cubic crystal structure which is characterized by a three-dimensional network with mutually connected intracrystalline voids accessible through pore openings which will admit molecules with critical dimensions up to 10 Å. The void volume is 51 volume percent of the zeolite and most adsorption takes place in the crystalline voids. Typical well-known zeolites which may be used include chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silica-polymorph disclosed in U.S. Pat. No. 4,061,724 and also the F-silicate disclosed in U.S. Pat. No. 4,073,895, hereby incorporated by reference. Detailed descriptions of some of the above-identified zeolites may be found in D. W. Breck, *Zeolite Molecular Sieves*, John Wiley and Sons, New York, 1974, hereby incorporated by reference. Preferably, the adsorbent is selected from the group consisting of Y-54, Y-74, Y-84, Y-85, low cerium mixed rare earth exchanged Y-84, calcined rare earth exchanged LZ-210 at a framework $SiO_2/Al_2O_3$ mol equivalent ratio of less than about 7.0 and mixtures thereof.

The adsorbent layer comprises an adsorbent paper layer and an adsorption spacer. The adsorption spacer is a screen-like fabric which provides for passage over the adsorbent paper layer. Preferably, there is an adsorbent spacer for each layer to facilitate contact between the fluid to be adsorbed and the adsorbent. The adsorption spacer is selected from the group consisting of nylon, polyester, coated polyester, polyethylene, polypropylene, coated nylon, and combinations thereof. For sorption cooling operation, the adsorption zone is on the outside surface of the envelope-like leaf and the heat transfer zone is disposed inside, or in the interior of the envelope-like leaf. The thermal resistance of the adsorption zone is very low compared to fixed bed adsorption zones which contain a mass of solid particles.

The envelope-like leaf comprises preferably a non-permeable material which separates the adsorption zone from the heat transfer zone. Preferably, the envelope-like leaf comprises a material with a high thermal conductivity, such as a metallic material to minimize the heat transfer resistance between the heat transfer zone and the adsorption zone. This material may be selected from the group consisting of MYLAR, metallic foil, nylon, polyester, coated polyester, polyethylene, polypropylene, coated nylon, and combinations thereof. Coated polyester and coated nylons are fabrics which are typically coated with epoxy to make them non-permeable. The metallic foil comprises pure metals and alloys of the metals selected from the group consisting of aluminum, steel, stainless steel, copper, silver, gold, and mixtures thereof. Although the thickness of the foil is not critical as long as it can be formed into the desired shape and be sealed at the edges of the envelope, it is preferred to employ a foil with a thickness ranging from about 0.01 mm to about 0.10 mm, and more preferably it is preferred to employ a foil with a thickness ranging from about 0.02 mm to about 0.05 mm. A metallic foil comprised of pure aluminum with a thickness ranging from about 0.02 mm to about 0.05 mm is most preferred. In the operation of the present invention it is critical to maintain the pressure on the outside of the envelope-like leaf at a pressure higher than the pressure on the inside of the heat transfer zone to prevent "ballooning" of the envelope-like leaf within the spirally wound structure. The structure of the spirally wound module is provided by the spacers, both the heat transfer spacers and the spacers in the adsorption zone. Ballooning will tend to put too much pressure at the cemented, or sealed ends of the module and may result in the premature failure or rupture of the envelope-like leaf and the module.

The adsorption zone and the heat transfer zone may be arranged to function either in pressure and temperature swing adsorption processes or in sorption cooling processes. According to the invention, for pressure and temperature swing adsorption processes the adsorption zone is contained in the envelope-like leaf and the heat transfer zone is outside of the envelope like leaf. In sorption cooling processes, the adsorption zone is disposed on the outside of the envelope-like leaf and the heat transfer zone is disposed inside the envelope-like leaf. The adsorbent layer comprises an adsorbent paper layer and a feed spacer. There can be any number of adsorbent layers in the adsorption zone, but it is preferred to limit the number of adsorbent layer to between 1 and about 10 to minimize the heat transfer resistance between the adsorbent layer and the heat transfer zone and to permit the spirally wound module to fit within the internal bore of a casing. Typically, the internal bore of the casing will range from about 50 mm (2 inches) to about 280 mm (11 inches). The spirally wound module is conventionally sealed in the casing with a seal which permits one fluid to flow axially across the spirally wound module and be recovered on the opposite end and separately permits flow into and out of the mandrel.

A heat transfer fluid such as a cold fluid to cool the adsorption zone to adsorption conditions of adsorption temperature and an adsorption pressure is introduced at a cold fluid temperature into the heat transfer zone. When required to raise the temperature of the adsorption zone to desorption conditions—such as a desorption temperature and a desorption pressure, a hot heat transfer fluid is introduced to the heat transfer zone. The cold heat transfer fluid and the hot heat transfer fluid may be selected from the group consisting of water, alcohols, ammonia, light hydrocarbons, chlorofluorocarbons, fluorocarbons, and mixtures thereof. Water is a preferred heat transfer fluid. Similarly, for sorption cooling operations, a refrigerant is selected from the group consisting of water, alcohols, ammonia, light hydrocarbons, chlorofluorocarbons, fluorocarbons, and mixtures thereof. It is preferred that the heat transfer fluids and the refrigerants not react with the materials of the envelope-like leaf and the feed spacers and heat transfer spacers. Additives and inhibitors such as amines can be added to the heat transfer fluids to pacify or inhibit such reactions.

The present invention uses grid-like or mesh layers for maintaining the gap adjacent to the adsorbent layer or within the envelope-like leaf. The mesh or open grid separation defines the channel dimensions for heat transfer fluid or feed fluid flow and provides structural support for the flow channels. The term "tricot" shall mean any grid-like or mesh layer which provides the flow channels and structural support for the flow channels in the present invention. Such tricot materials for flow distribution in spiral wound modules have been employed in reverse osmosis purification modules exemplified in U.S. Pat. Nos. 3,367,504, 3,417,870, 4,033,878, and 4,814,079 and are hereby incorporated by reference. Preferably, the tricot of the present invention comprises a layer of material having adjacent grooves extending in a single direction. The tricot may be fabricated from material selected from the group consisting of nylon, polyester, coated polyester, polyethylene, polypropylene, coated nylon, and combinations thereof. The coated material is typically coated with epoxy or polyurethane to make the material less permeable at high pressures of operation.

In accordance with the present invention, the adsorption pressure is generally from about 350 kPa to about 7 MPa (50 to 1000 psia) and preferably from about 350 kPa to about 3.5 MPa (100 to 515 psia). The desorption pressure is preferably from 3 to 550 kPa (about 0.5 to 80 psia) and more preferably the desorption pressure ranges from about 3 kPa to about 210 kPa (0.5 to 30 psia). Suitable operating temperatures are generally within the range of from about 10 to about 65° C. (50–150° F.). There can be a variety of cocurrent depressurization steps to intermediate pressures, cocurrent purging steps and countercurrent purging steps, all of which are well known to those skilled in the art and described in the previously cited patents relating to PSA processes. For example, one to 5 or more of such cocurrent depressurization steps can be employed for pressure equalization to further improve product recovery such as disclosed in the above-identified U.S. Pat. No. 3,986,849. Other details of the pressure swing adsorption process are described in Fuderer et al., U.S. Pat. No. 3,986,849, the four adsorption zone systems described in Wagner, U.S. Pat. No. 3,430,418 and Batta, U.S. Pat. No. 3,564,816, the three adsorption zone systems described in Batta, U.S. Pat. No. 3,636,679, and the two adsorption zone systems described in McCombs, U.S. Pat. No. 3,738,087, the disclosures of which are hereby incorporated by reference. Furthermore, multiple stages of spirally wound adsorber modules, each containing the same or different adsorbents, may be arranged in series or in parallel to accomplish specific separation or fluid treatment objectives. In addition, the spirally wound adsorber modules of the present invention may be integrated with spiral wound gas permeable membrane modules to treat gas streams. One surprising advantage of the present invention is the reduction in the requirement for a high pressure ratios between the feed or adsorption pressure and the desorption pressure in the operation of an integrated pressure and temperature swing (PITSA) adsorption process. It was discovered that by using a thermal purge step, the ratio of the adsorption pressure to the desorption pressure can be reduced as the degree of thermal purge is increased to achieve the same separation. The actual amount of this pressure ratio reduction will vary with the specific application.

DETAILED DESCRIPTION OF THE FIGURES

FIG. 1 is a perspective view of the construction of a spiral wound module for use in a pressure and temperature swing adsorption process. With reference to FIG. 1, for such process applications the spiral wound module which comprises an adsorption zone and a heat transfer zone in intimate thermal contact with the adsorption zone is spirally wound about a hollow mandrel (10). The hollow mandrel (10) comprises at least one row of spaced apart holes or slits (9) which form a permeable surface along the primary axis (10') of the mandrel (10). At least one envelope-like leaf (1) is connected with an adhesive to the outer surface of the hollow mandrel. The envelope-like leaf (1) has an opened end (25) at the mandrel and a closed end opposite (25') and encloses at least a portion of the aligned holes (9), or permeable surface to provide communication between the mandrel interior (11') and the envelope interior. At least one heat transfer spacer (2) and (3) is provided in the envelope interior, extending from the open end (25) towards the closed end (25'). The heat transfer spacer (2,3) is a combination of a first tricot layer (2) having grooves extending in one direction and a second tricot layer (3) having grooves extending in the opposite direction. With reference to FIG. 5 showing an exploded detail of the heat transfer spacer (71,72), the grooves (75) in the first layer (72) are in fluid communication with the grooves (76) of the second tricot layer (71) and the grooves (75) of the first tricot layer (72) and the grooves (76) of the second tricot layer (71) extend in opposite directions. Returning to FIG. 1, the heat transfer spacer (2) and (3) is enclosed by the envelope-like leaf 1 which enclosed the first tricot layer (2) and the second tricot layer (3) is sealed by the fold in the envelope material at the closed end (25') and is sealed with an adhesive at the proximal (10a) and distal end (10b) of the spiral wound module. An adsorbent layer comprising at least one layer of an adsorbent paper layer (5) and at least one feed spacer (6) is disposed on a side of the outer envelope surface with the adsorbent paper layer in intimate thermal contact with the outer envelope surface. In FIG. 1, a second adsorbent layer comprising a second adsorbent paper layer (7) and a second feed spacer (8) is disposed on the first feed spacer (6) and the first adsorbent paper layer (5). The envelope-like leaf (1) and the adsorbent layer (5–8) are spirally wound around the mandrel (10) to produce the spirally wound module of the present invention for pressure and temperature swing adsorption. A flow blocking device such as a plug (12) or obstruction disposed rigidly or cemented in the hollow mandrel prevents longitudinal flow through the mandrel and facilitates flow of heat transfer fluid from an inlet or proximal end (10a) of the mandrel to the distal end (10b) or outlet end opposite of the mandrel.

Figure 2:
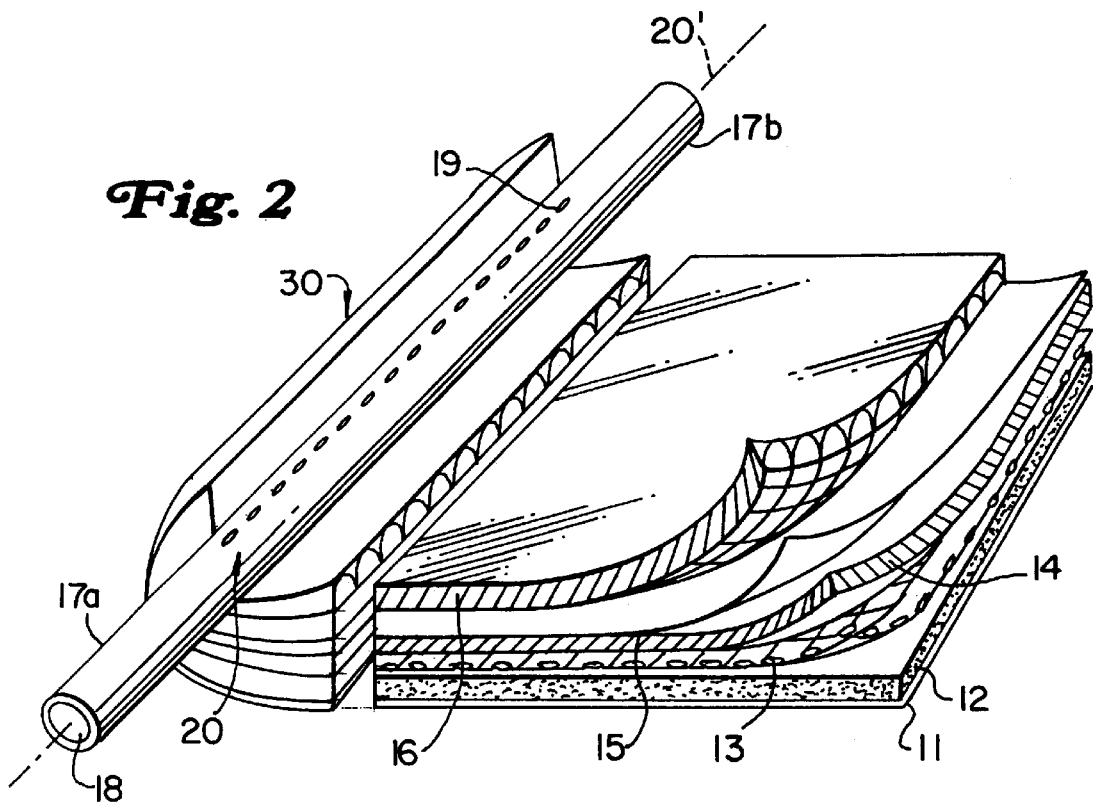
FIG. 2 is a perspective view of a spiral wound module of the present invention as seen during fabrication of a module for use in a sorption cooling process.

FIG. 2 is a perspective view of the construction of a spirally wound module (30) for sorption cooling applications. According to the present invention, a hollow mandrel (20) has a bore (18) through which refrigerant can enter at a proximal end (17a) and exit at a distal end (17b). The hollow mandrel (20) has a primary axis (20') and at least 1 row of longitudinally spaced apart holes or slits (19). An envelope-like leaf (11) and (15) formed of layers of a non-permeable material enclose an adsorbent layer comprising an adsorbent spacer in combination with at least one adsorbent paper layer that has intimate thermal contact with the envelope-like leaf (11). Preferably, at least one adsorbent spacer (13) separates the at least two adsorbent paper layers (12,13) to provide an adsorption zone wherein the refrigerant enters from bore (18) through longitudinally spaced apart holes (19) into the space between the adsorbent paper layers, thus avoiding the potential for condensation on the inside surface of the envelope-like leaf. Disposed on the outside of the envelope-like leaf is a feed spacer (16) to provide a passage for heat transfer fluid to pass through the spiral wound module in an axial direction across the outside layers of the envelopes-like leaf (11, 15).

Figure 3:
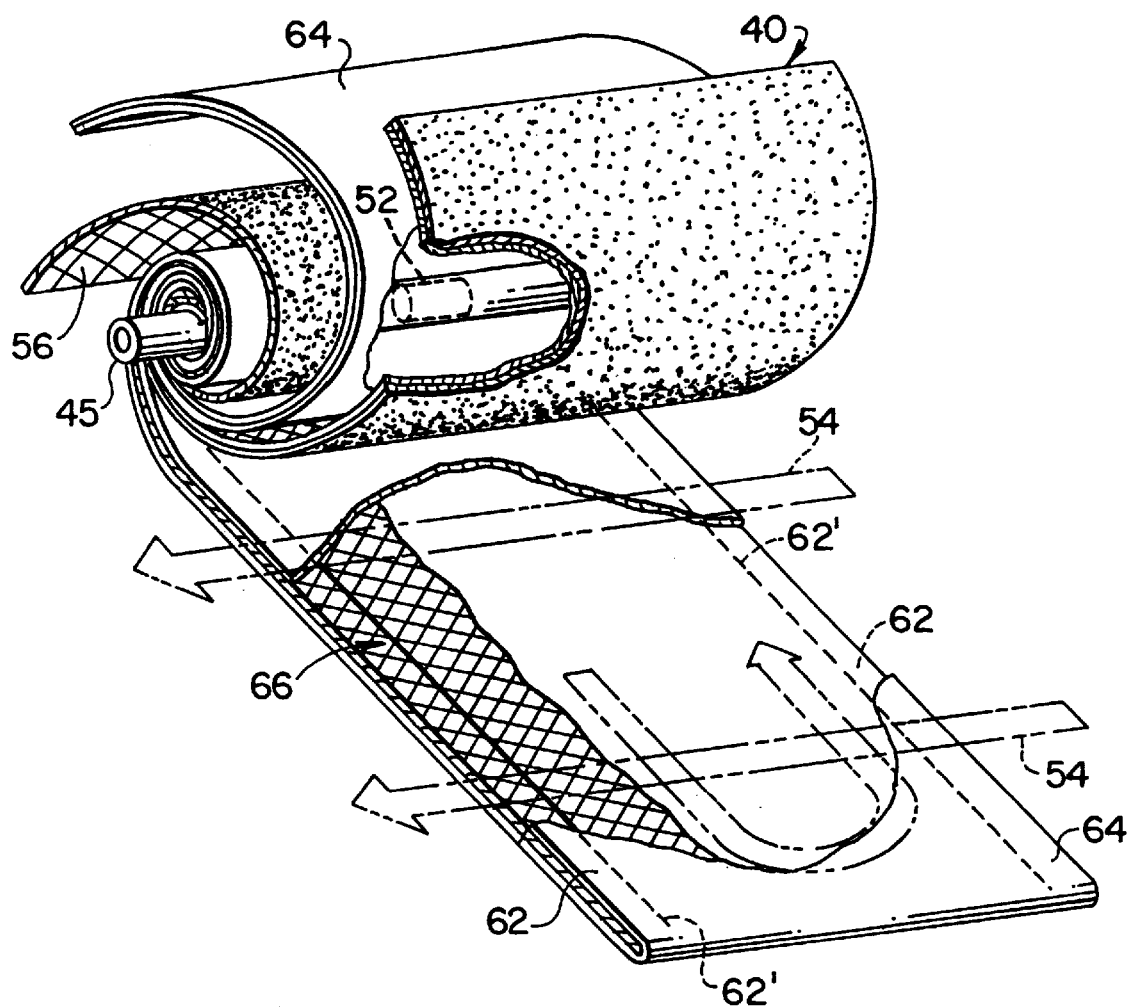
FIG. 3 is a perspective view of a spiral wound module of the present invention for pressure and temperature swing adsorption processes.

FIG. 3 is a perspective view of the construction of a spiral wound module 40 of the present invention for use with pressure and temperature swing adsorption processes. Arrows 54 indicate the flow of the fluid stream through the adsorption zone. With reference to FIG. 3, at least one envelope-like leaf (69) comprising a non-permeable material is sealed (62') along outer edges (62) in a conventional manner using adhesive. The envelope-like leaf encloses at least one heat transfer spacer (66) which extends from the open end at the mandrel towards the closed end. The heat transfer spacer is a combination of two tricot layers. FIG. 4 shows a detail of the leaf (64) and a mandrel (45) of FIG. 3. A first tricot layer (71) is disposed on the inside of the envelope-like leaf (64) with grooves extending in one direction to permit the flow of heat transfer fluid from the inside of the hollow mandrel (45) through the spaced apart holes (46) at a proximal end (45a) of mandrel (45). A second tricot layer (72) with grooves in the opposite direction and in fluid communication with the grooves in the first tricot layer (71) permits heat transfer fluid to flow across the envelope-like leaf (64) to the distal end (45b) of mandrel (45). The envelope-like leaf (64) is fixed or cemented to the outer mandrel surface of the mandrel (45) with adhesive in the conventional manner. Wrapping the sealed envelope-like leaf and enclosing the tricot layers (71, 72), around the mandrel (45) establishes communication of holes (46) with the interior of leaf (64). Application of an appropriate sealant along the outer edges of the envelope-like leaf (64) and at the mandrel completes sealing of the envelope-like leaf interior. A flow blocking device (52) prevents flow through the hollow mandrel from the proximal-end (45a) to the distal end (45b) and an optional flow distributor (70) directs the flow of heat transfer fluid within the envelope-like leaf (64) in a spirally outer direction and then returns the flow of heat transfer fluid in a spiral inner direction to the hollow mandrel through the aligned holes (46) at the distal end (45b) of the mandrel (45).

FIG. 6 illustrates a commercial cycle for the operation of a 5-zone pressure integrated temperature swing adsorption (PITSA) process. According to the cycle shown in FIG. 6, a feed stream comprising an adsorbable component and a non-adsorbable component at an adsorption temperature and an adsorption pressure is passed to a first PITSA zone, or spiral wound adsorber module of the present invention in an adsorption step (Ads), and an adsorption effluent is withdrawn. The first PITSA zone is thermally purged (TP) by introducing a hot heat transfer fluid to the heat transfer zone of the first PITSA zone. The thermal purge (TP) is preferably conducted in a cocurrent direction relative to the direction of the feed stream in the spirally wound adsorber module. As the thermal purge is performed, a thermal wave and composition wave are established in the adsorption zone of the first PITSA zone, resulting in the movement of the thermal and composition waves toward the effluent end of the PITSA zone. Thus, a portion of the adsorbable component is desorbed from the adsorption zone and drives the non-adsorbable component from the void spaces of the adsorption zone. Either prior to, simultaneously with, or subsequently to the thermal purge step, the first PITSA zone is cocurrently depressurized to an equalization pressure in an equalization step (Equal). An equilibrium effluent is withdrawn from the first PITSA zone during the equalization step and passed to another PITSA zone (zone 4) which has completed a purge step (Purge) prior to repressurization. The first PITSA zone is then countercurrently depressurized in a purge (PP) step to provide a purge gas stream to another PITSA zone (zone 5). The first PITSA zone is further countercurrently depressurized to the desorption pressure in a blowdown (BD) step to provide a first desorption stream comprising the adsorbable component. The first PITSA zone then is countercurrently purged (Purge) with purge gas from another PITSA zone (zone 2) to provide a second desorption stream and the first PITSA zone undergoes an equalization step (Equal) with another PITSA zone (zone 3) to conserve some of the pressure energy to partially repressurize zone 1. The first desorption stream and the second desorption stream are combined to provide a desorption effluent stream comprising the adsorbable component. The first PITSA zone is then repressurized in a repressurization step (Rep) with a portion of the adsorption effluent, preferably in a countercurrent direction relative to the fluid feed stream. On the heat transfer side of the PITSA, the thermal purge (TP) step is carried out by introducing a hot heat transfer stream to the feed end of the heat transfer zone of the first PITSA zone in a cocurrent direction relative to the fluid feed stream, and a warm heat transfer stream is withdrawn from the effluent end of the heat transfer zone of the first PITSA zone. In order to conserve energy on the heat transfer side of the PITSA zone, the warm stream at an intermediate temperature between the hot temperature of the hot heat transfer stream and the cold temperature of the cold heat transfer stream, is passed to a heat transfer zone of a PITSA zone which is being purged or being repressurized in an equalization step or being repressurized directly with a portion of the adsorption effluent in a repressurization step. Thus the warm heat transfer stream is used to partially cool the PITSA zone being repressurized or purged to provide a portion of the hot heat transfer stream. The cold heat transfer fluid further cools the first PITSA zone to return the first PITSA zone to the adsorption temperature. Each of the 5 PITSA zones undergo the steps of the process as shown in FIG. 6 and are repeated to provide a continuous process.

EXAMPLES

The following examples are provided for illustrative purposes and are not intended to limit the scope of the claims that follow.

Example I

A comparison of a conventional pressure swing adsorption process and a PITSA process based on an engineering simulation of the separation is determined as follows. It is desired to produce a high purity carbon dioxide stream from a feed stream available at a pressure of about 140 kPa (20 psia) with the following composition: 45 mol-% carbon dioxide, 25 mol-% hydrogen, 10 mol-% methane, and 20 mol-% carbon monoxide. Compression of the feed and of the desorption effluent are available to raise the feed pressure to a pressure between about 300 kPa (45 psia) to about 700 kPa (100 psia) and it is desired to produce a high purity carbon dioxide stream at about 2.1 MPa (300 psia), requiring a product compressor to raise the desorption effluent from about 35–70 kPa (5–10 psia) to about 2.1 MPa (300 psia). The Table 1 shows the relative bed size factors and relative compressor power requirements for the PSA and PITSA processes. The PITSA process with a pressure ratio of 100:20 shows a clear advantage over the PSA process with a bed size factor (relative adsorbent inventory) of one-fourth of the PSA system and about an 8.5 percent lower power requirement. When the PITSA pressure ratio was lowered to 20:5, the relative bed size compared to the conventional fixed bed PSA process was still a surprising 100 percent smaller than the PSA process, but more importantly, the power requirement was now about 162 percent lower than the PSA process. This lower power requirement translates into significant operating cost savings. The lower bed size factor represents a further significant capital and operating cost savings over the conventional PSA process.

TABLE 1

PSA - PITSA COMPARISON for CO$_2$ SEPARATION

| Process: | Pressure Ratio: | Relative Bed Size: | Relative Power: |
|---|---|---|---|
| PSA | 100:12 | 2.0 | 4.7 |
| PITSA | 100:20 | 0.5 | 4.2 |
| PITSA | 20:5 | 1.0 | 2.9 |

Example II

A sample spiral wound module for sorption cooling applications was prepared according to the following procedure. A hollow mandrel was selected from a 305 mm (12 inch) tube of polyvinyl chloride with an outside diameter of about 1.689 mm (0.0665 inch) and with two rows of 8 longitudinally aligned holes spanning a length of about 130 mm (5.25 inch) beginning about 76 mm (3 inch) from the ends of the tube. The following material of approximate size was prepared:

| Material | Length, mm | Width, mm | |
|---|---|---|---|
| Aluminum Foil | 915 | 279 | (36" × 11") |
| Tricot | 890 | 229 | (35" × 9") |
| Adsorbent Paper | 720 | 229 | (34" × 9") |
| Feed Spacer | 470 | 279 | (18.5" × 11") |

The aluminum foil, tricot and adsorbent paper were folded with an overlap of about 35 mm. Two envelop-like leaves were assembled in the conventional manner placing the feed spacer within the adsorbent paper and the molecular sieve paper fold was placed inside the aluminum foil fold. The tricot fold was positioned on the outside of the aluminum foil fold. Each leaf was attached to the hollow mandrel so that the aluminum foil envelope enclosed a row of longitudinally aligned holes. A bead of epoxy adhesive was applied near the edge of the adsorbent paper on the inside of the aluminum foil edges at the end seal area of the envelope-like leaves. The envelope-like leaves were wound in the conventional manner and the adhesive allowed to cure before the ends of the envelope-like leaves were trimmed. The adsorbent paper was as described in U.S. Pat. No. 5,650,221 and contained a rare earth exchanged Y-84 adsorbent. The aluminum foil was about 0.05 mm in thickness. The tricot was an epoxy-impregnated polyester fabric having a thickness of about 0.28–0.33 mm (0.011–0.013 inches), normally used for reverse osmosis applications and available from Hornwood, Inc. as Tricot 1229. The feed spacer was polypropylene screen having a thickness of about 3.81 mm (0.15 inches) and about 11 oval round strands per inch at 90 degrees, available as Naltex from Nalle Plastics, Inc., Austin, Tex.

We claim:

1. A pressure and temperature swing adsorption process using a spirally wound module, said spirally wound module comprising a hollow mandrel provided with a plurality of longitudinally spaced apart holes, said mandrel having a mandrel interior and an outer mandrel surface; at least one envelope leaf fixed to the outer mandrel surface, said envelope leaf having an open end at the outer mandrel surface and a closed end opposite and forming an envelope interior and an outer envelope surface and enclosing at least a portion of said longitudinally spaced apart holes to provide communication between the mandrel interior and the envelope interior through said holes, the envelope leaf being spirally wrapped around the mandrel; an adsorbent layer comprising at least one adsorbent paper layer and at least one feed spacer spirally wrapped around the mandrel so that the adsorbent paper layer is disposed on a side of the outer envelope surface to form an adsorption zone; a flow blocking device substantially blocking axial flow of a heat exchange fluid through the interior of the mandrel to provide a heat transfer inlet zone at a proximal end and a heat transfer outlet zone at a distal end of the mandrel; at least one spacer provided in the envelope interior extending from the open end towards the closed end, the heat transfer spacer being a combination of a first tricot layer having grooves extending in one direction and a second tricot layer having grooves extending in the opposite direction, said grooves in the first layer being in fluid communication with the grooves in the second tricot layer, said process comprising the steps of:

a) passing a feed gas stream to an adsorption zone at a feed end of a spirally wound module and withdrawing an adsorption effluent from a product end opposite;

b) thermally purging the adsorption zone by passing a hot heat transfer stream to the hollow mandrel to establish a thermal wave in the adsorption zone at a point between the feed end and the product end of the adsorption zone, withdrawing a warm heat transfer stream from said mandrel, and simultaneously or subsequently purging the adsorption zone with a purge stream and recovering a second adsorption effluent;

c) purging the adsorption zone with a second purge stream at a desorption temperature to produce a desorption effluent;

d) passing a portion of the warm heat transfer stream and a cold heat transfer stream to the hollow mandrel to return the adsorption zone to the adsorption temperature and repressurizing the adsorption zone; and, e) repeating step (a)–(d) to provide a continuous process.

2. A process for continuous sorption cooling using at least two spirally wound modules each of the spirally wound adsorbent modules comprising a hollow mandrel provided with a plurality of longitudinally spaced apart holes, said mandrel having a mandrel interior and an outer mandrel surface; at least one envelope leaf fixed to the outer mandrel surface, said envelope leaf having an open end at the outer mandrel surface and a closed end opposite and forming an envelope interior, an interior envelope surface, and an outer envelope surface and enclosing at least a portion of said longitudinally spaced apart holes to provide communication between the mandrel interior and the envelope interior through said spaced apart holes, the envelope leaf being spirally wrapped around the mandrel; an adsorbent layer provided in the envelope interior extending from the open end towards the closed end, said adsorbent layer comprising at least one adsorbent paper layer disposed on the interior envelope surface and at least one adsorbent spacer, the adsorbent spacer being a first tricot layer having grooves extending in one direction; at least one adsorbent spacer spirally wrapped around the mandrel and disposed on a side of the outer envelope surface forming a heat transfer zone in said spirally wound adsorbent module, said process comprising the following steps:

a) passing a hot heat transfer stream to a first spirally wound module of at least two spirally wound modules to desorb a refrigerant from an adsorbent layer containing an adsorbent selective for the adsorption of the refrigerant to provide a refrigerant vapor stream;

b) withdrawing the refrigerant vapor stream at a desorption pressure from the mandrel of the first spirally wound module and passing the refrigerant vapor stream to a condenser wherein the refrigerant vapor stream is cooled and at least partially condensed to provide a condensed refrigerant stream;

c) passing the condensed refrigerant stream to an isolation valve to reduce the pressure of the condensed refrigerant stream to an evaporator pressure and providing a cooled condensed refrigerant stream;

d) passing the cooled condensed refrigerant stream to an evaporator wherein the cooled condensed refrigerant stream is heat exchanged with an external stream to cool the external stream to provide a vaporized refrigerant stream;

e) passing a cold heat transfer stream to a heat transfer zone of another spirally wound module to cool the adsorbent layer and passing the vaporized refrigerant stream to the other spirally wound module to adsorb the vaporized refrigerant stream; and, f) repeating steps (a) through (e) to provide a continuous sorption cooling process.

3. The continuous sorption cooling process of claim 2 wherein the refrigerant is selected from the group consisting of water, alcohols, ammonia, light hydrocarbons, chloro-fluoro-hydrocarbons, fluorocarbons, and mixtures thereof.

4. The continuous sorption process of claim 2 wherein the adsorbent comprises a solid adsorbent selected from the group consisting of silica gel, activated carbon, clays, metallic salts, zeolite molecular sieves, and mixtures thereof.

5. The continuous sorption cooling process of claim 2 wherein the refrigerant comprises water and the adsorbent comprises zeolite Y.

6. The continuous sorption cooling process of claim 5 wherein the zeolite Y is selected from the group consisting of Y-54, Y-74, Y-85, low cerium rare earth exchanged Y-84, low cerium rare earth exchanged LZ-210, and mixtures thereof.

7. The continuous sorption cooling process of claim 2 wherein the external stream is a plant process stream or a fluid from a conditioned space.

8. The continuous sorption cooling process of claim 2 wherein the hot heat transfer stream comprises a hot temperature of about 80° C. to about 350° C. and the cold heat transfer stream comprises a cold temperature of about −10° C. to about 50° C.

9. A spirally wound adsorbent module for use in sorption and heat exchange applications comprising:

a hollow mandrel having a mandrel interior, an outer mandrel surface, and a permeable surface extended along its primary axis for passing a fluid from the mandrel interior to the outer mandrel surface;

at least one envelope leaf connected to the outer mandrel surface, said envelope leaf having an open end in communication with the permeable surface, an interior envelope surface, and an outer envelope surface and enclosing an envelope interior and sealed edges sealing opposite sides of the interior envelope surface and outer envelope surface and extending in a direction transverse to the open end, the envelope leaf being spirally wrapped around the mandrel;

at least one interleaved layer spirally wrapped between the interior envelope surface and the outer envelope surface;

an adsorbent layer spirally wrapped around the mandrel in the envelope interior or as a portion of the interleaved layer, said adsorbent layer comprising adsorbent disposed on a laminar substrate and at least one adsorbent spacer, the adsorbent spacer providing a fluid flow channel parallel to the adsorbent layer; and, at least one exchange fluid spacer spirally wrapped around the mandrel in either the envelope interior or as a portion of the interleaved layer and separated from the adsorbent layer by the interior envelope surface and the outer envelope surface forming a heat transfer zone in said spirally wound adsorbent module.

10. A spirally wound module for pressure and temperatures swing adsorption comprising:

a hollow mandrel having a plurality of longitudinally spaced apart holes and said mandrel having a mandrel interior and an outer mandrel surface;

at least one envelope leaf connected to the outer mandrel surface, said envelope leaf having an open end at the outer mandrel surface and a closed end opposite and forming an envelope interior and an outer envelope surface and enclosing at least a portion of said plurality of longitudinally spaced apart holes to provide communication between the mandrel interior and the envelope interior through said holes, the envelope leaf being spirally wrapped around the mandrel;

an adsorbent layer comprising at least one adsorbent paper layer and at least one feed spacer spirally wrapped around the mandrel so that the adsorbent paper layer is disposed on a side of the outer envelope surface;

a flow blocking device substantially blocking the axial flow of a heat exchange fluid through the interior of the mandrel to provide a heat transfer inlet zone at a proximal end and a heat transfer outlet zone at a distal end of the mandrel; and at least one heat transfer spacer provided in the envelope interior extending from the open end towards the closed end, the heat transfer spacer being a combination of a first tricot layer having grooves extending in one direction and a second tricot layer having grooves extending in the opposite direction, said grooves in the first layer being in fluid communication with the grooves in the second tricot layer.

11. The spirally wound module of claim 10 wherein the envelope leaf comprises a non-permeable material selected from the group consisting of metallic foil, nylon, polyester, coated polyester, polyethylene, polypropylene, coated nylon, steel, and combinations thereof.

12. The spirally wound module of claim 10 wherein the envelope leaf comprises a pure aluminum metal foil having a thickness between about 0.02 mm and about 0.05 mm.

13. The spirally wound module of claim 10 wherein the feed spacer is a net having a thickness of about 0.3 to about 2 mm from a material selected from the group consisting of polyethylene, polypropylene, and nylon.

14. The spirally wound module of claim 10 wherein the flow blocking device comprises a material selected from the group consisting of hard vinyl chloride, an ABS resin, nylon, and a rubber.

15. The spirally wound module of claim 10 wherein the adsorbent layer comprises from about 1 to about 20 alternating layers of the adsorbent paper layer and the feed spacer.

16. The spirally wound module of claim 10 further comprising a flow distributor provided in the envelope interior for directing the flow of the heat transfer fluid into the envelope leaf through at least a portion of said plurality of longitudinally spaced apart holes aligned on one side of the mandrel so that the heat transfer fluid travels in the envelope leaf in a spirally outer direction and then returns in a spirally inner direction where the fluid flows back into the heat transfer conduit to the heat transfer outlet zone through at least a portion of said plurality of the longitudinally spaced apart holes on an other side of the flow blocking device.

17. A spirally wound adsorbent module for use in sorption cooling applications comprising:

a hollow mandrel provided with a plurality of longitudinally spaced apart holes, said mandrel having a mandrel interior and an outer mandrel surface;

at least one envelope leaf connected to the outer mandrel surface, said envelope leaf having an open end at the outer mandrel surface and a closed end opposite and forming an envelope interior, an interior envelope surface, and an outer envelope surface and enclosing at least a portion of said longitudinally spaced apart holes to provide communication between the mandrel interior and the envelope interior through said holes, the envelope leaf being spirally wrapped around the mandrel;

an adsorbent layer provided in the envelope interior extending from the open end towards the closed end, said adsorbent layer comprising at least one adsorbent paper layer disposed on the interior envelope surface and at least one adsorbent spacer, the adsorbent spacer being a first tricot layer having grooves extending in one direction; and, at least one feed spacer spirally wrapped around the mandrel disposed on a side of the outer envelope surface forming a heat transfer zone in said spirally wound adsorbent module.

18. The spirally wound adsorbent module of claim 17 wherein the paper adsorbent layer comprises an adsorbent selected from the group consisting of zeolite X, zeolite Y, zeolite A, silica gel, silicas, aluminas, and mixtures thereof.

19. The spirally wound adsorbent module of claim 17 wherein the paper adsorbent layer comprises an adsorbent selected from the group consisting of zeolite Y-54, zeolite Y-74, zeolite Y-84, zeolite Y-85, low cerium rare earth exchanged Y-84, and low cerium rare earth exchanged zeolite LZ-210.

20. The spirally wound adsorbent module of claim 17 further comprising the adsorbent spacer being a combination of said first tricot layer and a second tricot layer having grooves extending in the same or opposite direction as the grooves in the first tricot layer, said grooves in the first layer being in fluid communication with the grooves in the second tricot layer.

* * * * *